United States Patent

Martinez et al.

(10) Patent No.: US 10,480,480 B2
(45) Date of Patent: Nov. 19, 2019

(54) HYDRAULIC TURBINE

(71) Applicant: GE RENEWABLE TECHNOLOGIES, Grenoble (FR)

(72) Inventors: Lionel Martinez, Grenoble (FR); Jean-Bernard Houdeline, Grenoble (FR); Geoffrey Darona, Grenoble (FR); Claude Beral, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 135 days.

(21) Appl. No.: 15/655,166

(22) Filed: Jul. 20, 2017

(65) Prior Publication Data

US 2018/0023534 A1 Jan. 25, 2018

(30) Foreign Application Priority Data

Jul. 25, 2016 (EP) ..................................... 16290143

(51) Int. Cl.
*F03B 3/18* (2006.01)
*F03B 3/02* (2006.01)
(Continued)

(52) U.S. Cl.
CPC .................. *F03B 3/18* (2013.01); *F03B 3/02* (2013.01); *F03B 3/125* (2013.01); *F03B 11/006* (2013.01);
(Continued)

(58) Field of Classification Search
CPC .... F03B 3/18; F03B 3/125; F03B 3/02; F03B 11/04; F03B 11/006; Y02E 10/226; Y02E 10/223; F05B 2260/96; F16J 15/164
See application file for complete search history.

(56) References Cited

U.S. PATENT DOCUMENTS 2,416,268 A * 2/1947 Nagler .................. F03B 11/006
277/632
3,237,564 A * 3/1966 Hartland .................. F03B 3/183
100/901
(Continued)

FOREIGN PATENT DOCUMENTS

CA 2 655 939 A1 1/2008
CA 2763303 A1 * 12/2010 .............. F03B 3/121
(Continued)

OTHER PUBLICATIONS

Zuo, Z., et al., "Pressure fluctuations in the vaneless space of High-head pump-turbines—A review," Renewable and Sustainable Energy Reviews, pp. 965-974 (2015).
(Continued)

*Primary Examiner* — Hung Q Nguyen
(74) *Attorney, Agent, or Firm* — Dority & Manning, P.A.

(57) ABSTRACT

A hydraulic turbine includes a rotor with a runner, which is concentrically surrounded by a stator, whereby the runner comprises a plurality of runner blades arranged and distributed in a ring around a rotor axis, and each runner blade extends between a runner crown and a runner band; whereby the stator comprises a plurality of guide vanes arranged and distributed in a ring around the rotor axis, and each guide vane extends between an upper stator ring and a lower stator ring; and whereby a predetermined clearance is provided at least between the runner band and the lower stator ring. A substantial reduction of pressure pulsations in the vane-less gap between said runner blades of said runner is achieved by substantially increasing said predetermined clearance.

6 Claims, 3 Drawing Sheets

(51) Int. Cl.
  *F03B 11/00* (2006.01)
  *F03B 11/04* (2006.01)
  *F03B 3/12* (2006.01)
  *F16J 15/16* (2006.01)

(52) U.S. Cl.
  CPC ........... *F03B 11/04* (2013.01); *F05B 2260/96* (2013.01); *F16J 15/164* (2013.01); *Y02E 10/223* (2013.01); *Y02E 10/226* (2013.01)

(56) References Cited

U.S. PATENT DOCUMENTS

| | | | | |
|---|---|---|---|---|
| 3,245,656 | A * | 4/1966 | Desbaillets | F03B 3/02 415/109 |
| 3,360,238 | A * | 12/1967 | Koeller | F03B 11/006 415/109 |
| 4,218,182 | A * | 8/1980 | Tsunoda | F03B 3/16 415/205 |
| 4,286,919 | A * | 9/1981 | Yamaguchi | F03B 3/103 415/112 |
| 4,568,241 | A * | 2/1986 | Kubota | F03B 3/02 415/104 |
| 5,290,148 | A | 3/1994 | Tsunoda et al. | |
| 2004/0037698 | A1 | 2/2004 | Gokhman | |
| 2005/0214115 | A1 * | 9/2005 | Keck | D04H 1/4374 415/206 |
| 2015/0192101 | A1 * | 7/2015 | Rossi | F03B 3/125 416/186 R |
| 2016/0160834 | A1 * | 6/2016 | Ko | F03B 3/02 415/155 |

FOREIGN PATENT DOCUMENTS

| | | | | |
|---|---|---|---|---|
| CA | 2832987 | A1 * | 10/2012 | ................ F03B 3/02 |
| EP | 0 565 805 | A1 | 10/1993 | |
| JP | S55-51964 | A | 4/1980 | |
| JP | S55-60666 | A | 5/1980 | |
| JP | 58038387 | A * | 3/1983 | ........... F03B 11/063 |
| JP | H06-74138 | A | 3/1994 | |
| WO | 2008/004877 | A1 | 1/2008 | |

OTHER PUBLICATIONS

Extended European Search Report and Opinion issued in connection with corresponding EP Application No. 16290143.3 dated Feb. 14, 2017.

* cited by examiner

HYDRAULIC TURBINE

BACKGROUND OF THE INVENTION

The present invention relates to the technology of hydraulic machines. It refers to a hydraulic turbine.

When designing a hydraulic turbine multiple objectives need to be reached simultaneously. Efficiency appears as the predominant one. However, extending the operating range and ensuring a good behaviour of the machine in terms of stability and safety become more and more important. For instance, the customer is now demanding to get a low vibration level in the turbine pit because high intensity vibrations can damage the machine.

These vibrations result from the mechanical response of the structure to hydraulic excitations coming from the interactions between the rotor (the runner) and stator (RSI).

FIG. 1 shows as an example the main parts of a hydraulic turbine of the Francis type. The hydraulic turbine 10 of FIG. 1 comprises a vertical rotor with a runner 12 and a turbine shaft 12a. Runner 12 comprises a plurality of runner blades 16 distributed in a ring around the rotor axis. Rotor 12, 12a is concentrically surrounded by a stator 11, which is arranged between rotor 12, 12a and a surrounding scroll casing 13. Stator 11 is equipped with a plurality of fixed and movable guide vanes 15. Guide vanes 15 direct the stream of water, which is supplied through scroll casing 13 in a circumferential manner, onto runner blades 16 in order to put runner 12 into rotational motion. The water leaves runner 12 in axial direction through a draft tube 14.

The position of the stator 11 relative to the runner 12 (dashed circle in FIG. 1) is shown in detail in FIG. 2. Guide vane 15 of stator 11 extends in vertical direction between an upper stator ring 19 and a lower stator ring 20. Runner blades 16 extend in runner 12 between a runner crown 17 and a runner band 18. Between runner band 18 and the surrounding lower stator ring 20 there is a predetermined clearance C.

Now, the passage of runner blades 16 in front of guide vanes 15, in the so-called vane-less gap VG, produces a local oscillating pressure field especially in case of high head pump turbines (see pressure pulsations 22 in FIG. 3). This dynamic pressure field is mainly due to the pressure variation, on either side of the profiles of guide vanes 15 and runner blades 16, evolving at different frequencies.

Reducing this oscillating pressure field (or pressure fluctuation level) in the vane-less gap VG is a continuous challenge for the designers and manufacturers of hydraulic machines, but few techniques exist to raise this challenge.

Document WO 2008004877 A1 discloses a water turbine of the reaction type, such as a Francis or Kaplan turbine, comprising a rotor and a surrounding housing, with sealing means between the rotor and the housing. In this type of turbine there is a problem in that a large part of the losses is connected with seal leakage. Simple labyrinth seals are often used, but they require large clearances and so have large losses. On this background it is said to be important to provide a water turbine seal system that makes possible much smaller clearances than current labyrinth and other conventional seal designs, so as to obtain an efficiency improvement in high head Francis turbines, inter alia. The proposed sealing means comprises brush seals located at a radial distance from the rotor axis being a major proportion of the maximum radial dimension of the rotor. The disclosure aims at decreasing drastically the fluctuation level with an innovative, easy to set up and low-cost solution.

Document EP 0 565 805 A1 discloses a system for controlling the pulses of hydraulic pressure and power in a reaction hydraulic turbine. The system comprises means for introducing an additional, controlled, pulsating flow of water at the diffusor elbow, consisting, together or alternatively, of a) at least one moveable body inside the diffusor between a first, retracted position and a second, extended position; b) at least one auxiliary duct which is markedly parallel to the diffusor and connected to the said diffusor with its own inlet and outlet apertures the inlet opening being positioned at the end of the diffusor elbow controlled by a valve and the outlet opening being positioned adjacent to the piezometric basin; the said moveable body and valve being controlled in such a way as to make the volume of the diffusor vary to reduce the pulses of pressure in the diffusor to a minimum and to maintain the flow, the gap, the torque, and the power of the rotor of the turbine constant.

Document US 2004/037698 A1 describes an Exit Stay Apparatus for Francis and propeller hydraulic turbines. The purpose of the apparatus is to eliminate the loss of turbine efficiency and strong pulsations in draft tube caused by the axial circular vortex in all turbine operating regimes other than optimum without a noticeable decrease in maximum efficiency. The Exit Stay Apparatus has a crown and exit stay vanes secured to the crown. When installed in the turbine, the exit stay crown is located immediately after the runner crown, which is truncated at the bottom by a plane perpendicular to the central axis of the turbine. The exit stay crown together with the truncated runner crown forms water passages after the runner blade crown profile exit. The exit stay vanes are arranged in a circular array around the turbine axis, located after the runner blades, and attached at the periphery either to the draft tube cone or to an exit stay flange secured to the turbine discharge ring and to the draft tube cone.

Document WO 2008/060158 A2 relates to a hydraulic reaction turbine comprising a runner, a draft tube downstream of the runner, and injection means for introducing water into the draft tube in order to reduce pressure fluctuations therein, with one or more openings in the draft tube wall adapted to substantially evenly distribute injected water in the axial and/or circumferential direction of the draft tube.

Further examples of hydraulic turbine systems according to the prior art may be found in the following documents: JP 55060666 which discloses a method of miniaturising a turbine; JP 55051964 which discloses providing openings in the turbine to reduce water thrust; JP 06074138 which discloses a system which seeks to reduce friction loss; and U.S. Pat. No. 5,290,148 which is concerned with the thickness of a runner band and a crown, and rigidity in respect of structural matters.

SUMMARY OF THE INVENTION

It is an object of the present invention to decrease in a simple and effective way the pressure fluctuation level in the vane-less space, i.e. the gap between the runner and the guide vanes.

According to an aspect of the invention, there is provided a hydraulic turbine comprising a runner which may comprise a runner crown, a runner band and a plurality of runner blades extending between the runner crown and the runner band. The hydraulic turbine may comprise a stator which in an embodiment surrounds the runner. The stator may comprise an upper stator ring, a lower stator ring and a plurality of guide vanes extending between the upper stator ring and the lower stator ring.

Embodiments of the invention may be characterized in that a clearance is provided between the runner and the stator, wherein the clearance is in an embodiment arranged to minimize pressure pulsations developing in a vane-less gap between the runner blades of the runner and the guide vanes of the stator.

The clearance may be sized such that the local oscillating pressure field is reduced. The size and location of the clearance may be dependent on the dimensions and shapes of the stator and rotor.

In an embodiment, the clearance may comprise a first clearance between the runner crown and the upper stator ring. A first ratio may be defined between the first clearance and the radius of the runner crown. In an embodiment, the first ratio may be in the region of 0.02. Alternatively, the first ratio may be less than or more than 0.02.

In a further embodiment, the clearance may comprise a second clearance between the runner band and the lower stator ring. A second ratio may be defined between the second clearance and the second radius. In an embodiment, the second ratio may be in the region of 0.02. Alternatively, the second ratio may be less than or more than 0.02.

The first ratio may be substantially equal to the second ratio. Alternatively, the ratios may be different.

It is noted that the prior art does not consider the problem of how to reduce the oscillating pressure field. Furthermore, the feature of providing a clearance between the runner and the stator, wherein the clearance is arranged to minimize pressure pulsations developing in the vane-less gap, is not disclosed in the prior art.

JP 55060666 provides an example of obtaining and manipulating geometric data for the inside diameter and width of a runner. In an embodiment of the invention, the clearance is larger than found in the prior art. In fact, the teaching of JP 55060666 is to reduce any clearance between the runner and the stator, which would have a detrimental effect on the pressure pulsations. Other modifications are provided in the prior art, but the impact of adjusting the clearance to minimize pressure pulsations is not considered.

According to a second aspect of the invention, there is provided a hydraulic turbine comprising a rotor with a runner, which is concentrically surrounded by a stator. In an embodiment, the runner comprises a plurality of runner blades arranged and distributed in a ring around a rotor axis. Each runner blade may extend between a runner crown and a runner band. The stator may comprise a plurality of guide vanes arranged and distributed in a ring around the rotor axis. Each guide vane may extend between an upper stator ring and a lower stator ring. A predetermined clearance may be provided at least between the runner band and the lower stator ring.

An embodiment of the invention may be characterized in that said predetermined clearance may be substantially increased with respect to the prior art in order to dampen pressure pulsations developing in a vane-less gap between said runner blades of said runner and said guide vanes of said stator.

According to an embodiment of the invention said runner crown may have a first radius, said runner band may have a second radius, whereby a first clearance may be provided between said runner crown and said upper stator ring and a second clearance may be provided between said runner band and said lower stator ring, wherein the ratio between said first clearance and said first radius and the ratio between said second clearance and said second radius may be each higher than 0.02.

Specifically, the ratio between said first clearance and said first radius may equal the ratio between said second clearance and said second radius.

According to another embodiment of the invention said runner crown may have a first radius, said runner band may have a second radius, whereby a first clearance may be provided between said runner crown and said upper stator ring and a second clearance may be provided between said runner band and said lower stator ring, wherein the ratio between said first clearance and said first radius may be ≤0.02 and the ratio between said second clearance and said second radius may be ≥0.02.

According to a further embodiment of the invention said runner crown may have a first radius, said runner band may have a second radius, whereby a first clearance may be provided between said runner crown and said upper stator ring and a second clearance may be provided between said runner band and said lower stator ring, wherein the ratio between said first clearance and said first radius may be ≥0.02 and the ratio between said second clearance and said second radius may be ≤0.02.

It is to be appreciated that one or more of the aspects, embodiments and features of any of the above aspects or embodiments of the invention may be readily combined, as will be readily apparent to the skilled person.

BRIEF DESCRIPTION OF THE DRAWINGS

The present invention is to be explained by means of different embodiments and with reference to the attached drawings.

DETAILED DESCRIPTION OF THE INVENTION

The known solutions to reduce the pressure fluctuations are essentially focused on the design and the shape of components close to the vane-less gap (VG) area.

Among the most known and identified methods of reducing pressure fluctuations are: changing the blade number and/or the guide vanes number; changing the runner blade diameter, the inner diameter of the guide vane and/or the pitch diameter; changing the design of the runner at the turbine inlet, for example the shape of the leading edge (parabolic shape or linear), the thickness of the blade and/or the curvature of blades.

Some of these solutions are identified in the following publication: Zhigang et al. Pressure fluctuations in the vane-less space of high-head-pump-turbines—A review. Renewable and Sustainable Energy Reviews. 41 (2015) 965-974.

The above ways have counter effects like hydraulic efficiency decrease, hydraulic instabilities increase and thus a trade-off shall be found to reach minimum pressure pulsation levels.

An embodiment of the present invention significantly increases the mechanical clearance between rotor and stator (runner and ring) compared to prior art standards. Tests performed during two projects for two very different runners have shown impressive results when the clearance is increased with respect to prior art systems. The increased clearance acts as a damper for pressure pulsation, reducing the overall level of pressure pulsation.

One of the major advantages is the ease to set-up this solution, and also that it has only few drawbacks.

Figure 1:
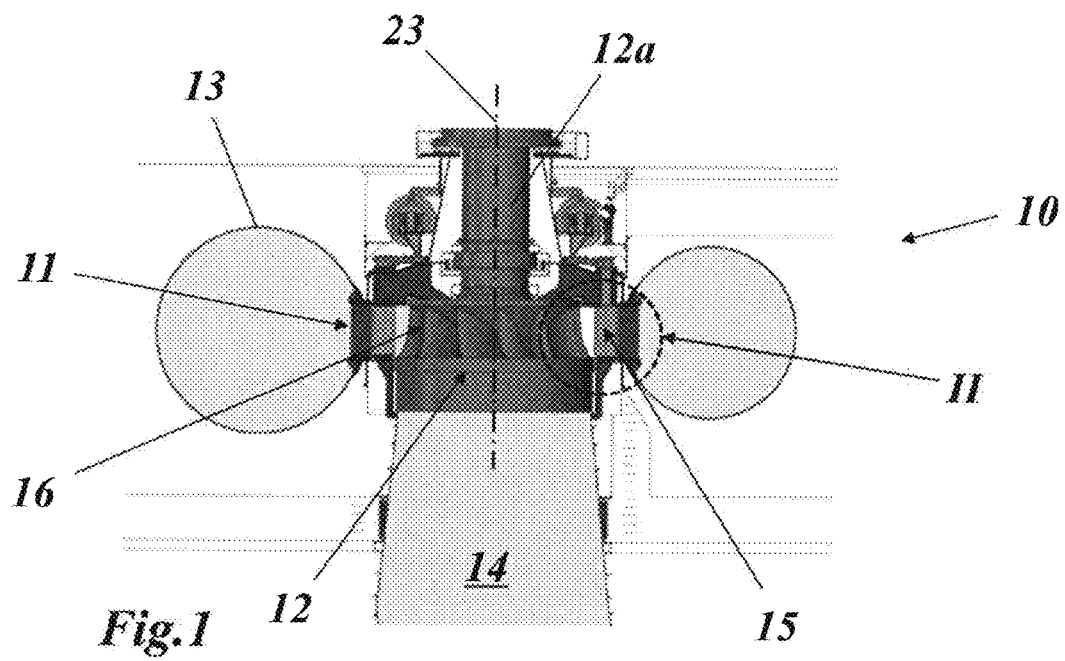
FIG. 1 shows a typical hydraulic turbine of the Francis type.
Figure 2:
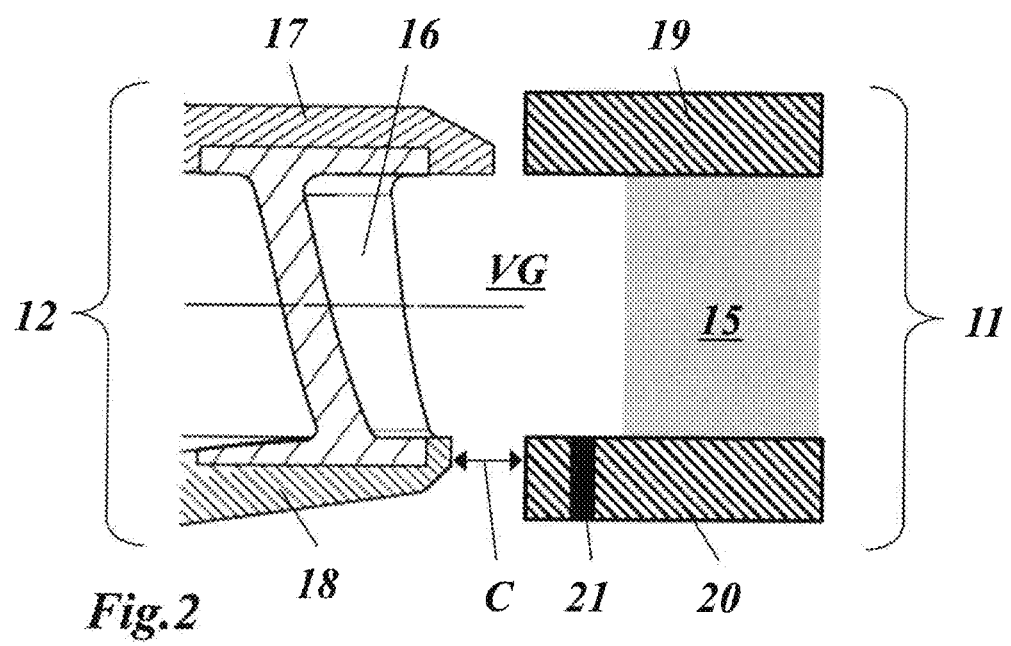
FIG. 2 shows as a magnified detail the gap between runner and stator of the turbine according to FIG. 1.
Figure 3:
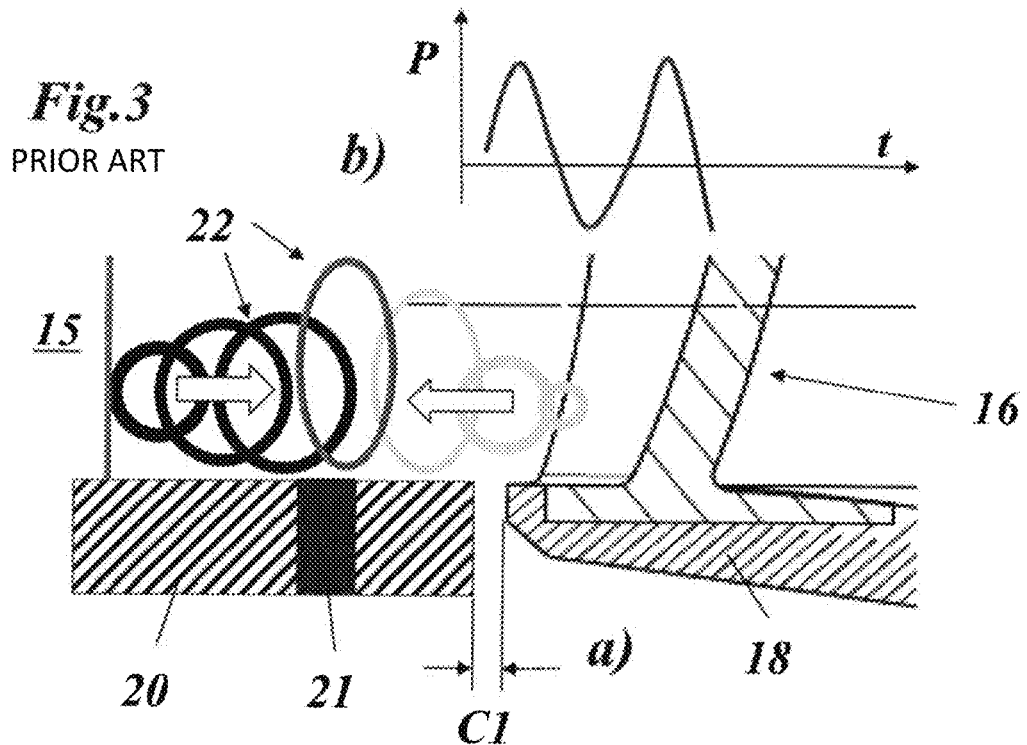
FIG. 3 shows the pressure fields and pressure pulsations in the gap of FIG. 2 for a prior art design.
Figure 4:
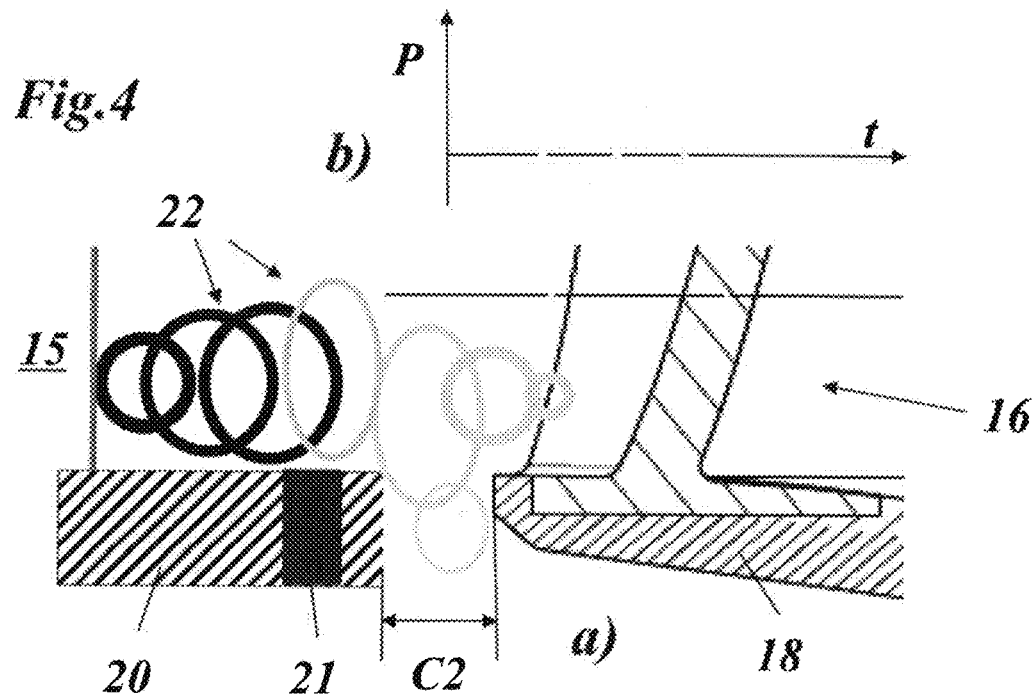
FIG. 4 shows—in contrast to FIG. 3—the pressure fields and pressure pulsations in the gap of FIG. 2 for an increased gap in accordance with an embodiment of the invention.

The damping effect of the substantial clearance increase is illustrated in FIGS. 3 and 4.

In FIG. 3, the clearance C1 between runner (runner band 18) and stator (lower stator ring 20) is small in accordance with prior art practice. The relative motion between guide vanes 15 and runner blades 16 generates a pressure field with pressure pulsations 22 coming from guide vanes 15 and a respective pressure field coming from the runner blades 16 (arrows in FIG. 3(a)). The interaction of both pressure fields increases the pressure (P(t) in FIG. 3(b)), which can be measured by suitable pressure sensors 21.

Increasing significantly the radial clearance C1→C2 (FIG. 4(a)) has a damping effect as the pulsations can easily escape from the vane-less gap VG through widened clearance C2. The measured pressure pulsations are then drastically reduced (P(t) in FIG. 4(b)).

Figure 6:
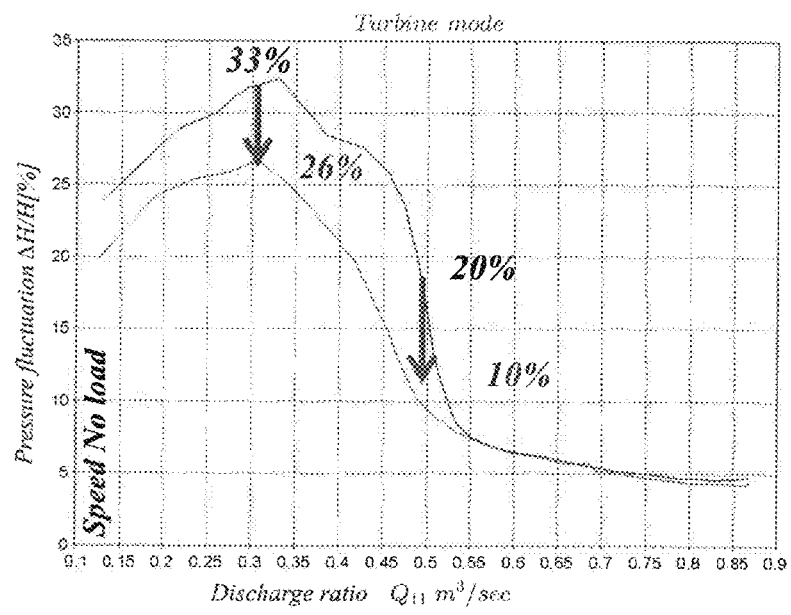
FIG. 6 shows an exemplary reduction in pressure pulsation amplitudes due to the proposed clearance increase.

A respective clearance increase has been performed during the development tests of an actual project (nominal head of 305 m) and has shown impressive results on pressure fluctuations level on the whole range of head (see FIG. 6), especially at part load (0.5 on x-axis) where the level decreased from 20% to 10%.

It can be seen also on a hill chart of pressure fluctuations that the effect of the proposed greater clearance C appears not only on the whole range of head but also especially for medium (50%=130 MW) to low output. This is particularly interesting for applications that specify very low values from partial load to speed no load.

Figure 5:
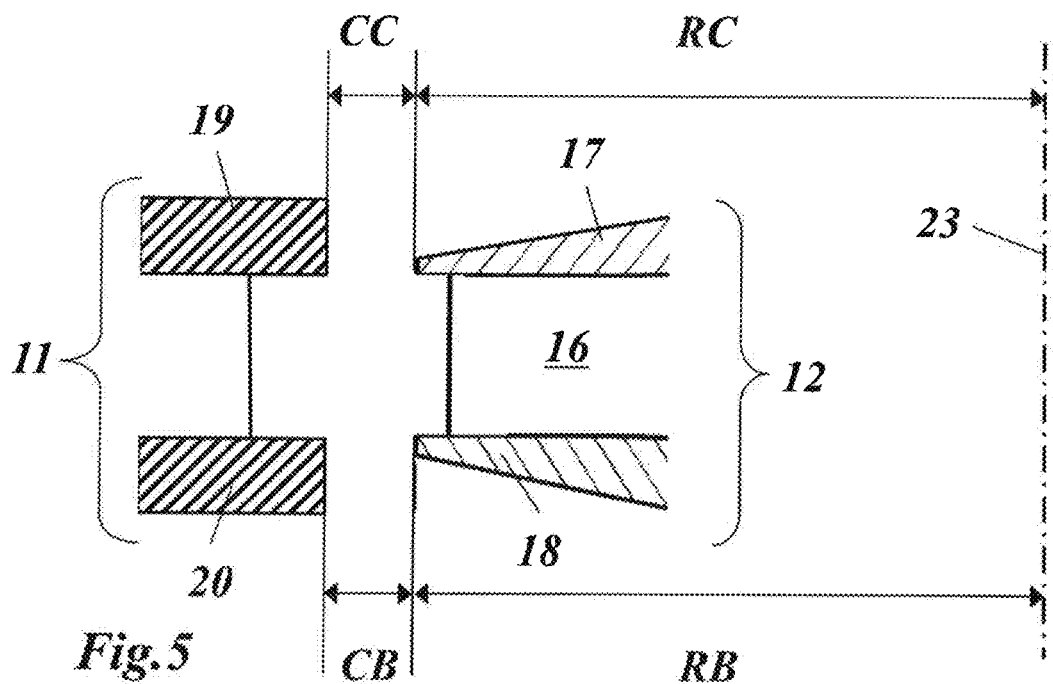
FIG. 5 shows various geometrical parameters used for specifying the clearance increase according to an embodiment of the invention.

FIG. 5 shows crown clearance CC between upper stator ring 19 and runner crown 17 and band clearance CB between lower stator ring 20 and runner band 18. Although shown as equal in FIG. 5, CC and CB may be different. Related to crown clearance CC is the crown radius RC. Related to band clearance CB is the band radius RB.

In prior art machines a typical CC/RC ratio=CB/RB ratio is about 0.007 (<0.012). According to embodiments of the present invention the increase in clearance may be specified to be CC/RC ratio=CB/RB ratio>0.02 (tested 0.0224 and 0.0298).

However, both ratios CC/RC and CB/RB need not be equal, but may differ, while both ratios are higher than 0.02 (CC/RC≠CB/RB and CC/RC>0.02 and CB/RB>0.02).

Furthermore, the ratio CC/RC between said first clearance CC and said first radius RC may be ≤0.02, while the ratio CB/RB between said second clearance CB and said second radius RB may be ≥0.02.

Alternatively, the ratio CC/RC between said first clearance CC and said first radius RC may be ≥0.02, while the ratio CB/RB between said second clearance CB and said second radius RB may be ≤0.02.

Advantages of embodiments of the present invention include: The proposed solution can be generally applied to hydraulic pumps/turbines. It can also be applied to Francis turbines (mainly for high head machines). It gives an immediate gain without additional costs. It is easy to set up. There is no particular constraint as it is directly taken into account in the mechanical design. For an installed base there is only to increase the clearance gap if this is enough (fast and cheaper). For new projects: There is an additional and positive effect for a design dedicated on the decrease of pressure fluctuation level in the vane-less gap.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A hydraulic turbine, comprising:
    a runner comprising a runner crown, a runner band, and a plurality of runner blades extending between the runner crown and the runner band; and
    a stator surrounding the runner, the stator comprising an upper stator ring, a lower stator ring, and a plurality of guide vanes extending between the upper stator ring and the lower stator ring,
    wherein a crown clearance is defined between the runner crown and the upper stator ring, wherein a first ratio of the crown clearance and a crown radius of the runner crown is greater than or equal to 0.02 so as to minimize pressure pulsations developing in a vane-less gap between the plurality of runner blades of the runner and the plurality of guide vanes of the stator.

2. The hydraulic turbine according to claim 1, further comprising:
    a band clearance between the runner band and the lower stator ring,
    wherein a second ratio is defined between the band clearance and a second radius of the runner band.

3. The hydraulic turbine according to claim 2, wherein the second ratio between the band clearance and the second radius is 0.02.

4. The hydraulic turbine according to claim 2, wherein the second ratio between the band clearance and the second radius is less than 0.02.

5. The hydraulic turbine according to claim 2, wherein the second ratio between said second clearance and said second radius is greater than 0.02.

6. The hydraulic turbine according to claim 2, wherein the first ratio is equal to the second ratio.

* * * * *